United States Patent
Panchenko et al.

(10) Patent No.: US 7,676,799 B1
(45) Date of Patent: Mar. 9, 2010

(54) ADDRESS SIMPLIFICATION BY BINARY TRANSFORMATION

(75) Inventors: Maksim V. Panchenko, Mountain View, CA (US); Fu-Hwa Wang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1141 days.

(21) Appl. No.: 11/149,848

(22) Filed: Jun. 10, 2005

(51) Int. Cl.
G06F 9/45 (2006.01)

(52) U.S. Cl. .................. 717/159; 717/141; 717/157

(58) Field of Classification Search .............. None
See application file for complete search history.

(56) References Cited

U.S. PATENT DOCUMENTS

| | | | |
|---|---|---|---|
| 6,292,938 B1 * | 9/2001 | Sarkar et al. | 717/138 |
| 6,801,996 B2 * | 10/2004 | Banno et al. | 712/210 |
| 7,310,799 B2 * | 12/2007 | Eisenberg et al. | 717/159 |
| 7,340,591 B1 * | 3/2008 | Pechanek et al. | 712/217 |

OTHER PUBLICATIONS

"(An almost) pedagogical pattern for pattern-based problem-solving instruction", Muller et al., Jun. 2004, pp. 102-106, <http://delivery.acm.org/10.1145/1010000/1008025/p102-muller.pdf>.*
"Formal validation of pattern matching code", Kirchner et al., Jul. 2005, pp. 187-197, <http://delivery.acm.org/10.1145/1070000/1069792/p187-kirchner.pdf>.*
"Micro patterns in Java code", Gil et al., Oct. 2005, pp. 97-116, <http://delivery.acm.org/10.1145/1100000/1094819/p97-gil.pdf>.*
"Enhancing the performance of 16-bit code using augmenting instructions", Krishnaswamy et al., Jul. 2003, pp. 254-264, <http://delivery.acm.org/10.1145/790000/780767/p254-krishnaswamy.pdf>.*

* cited by examiner

*Primary Examiner*—Tuan Q Dam
*Assistant Examiner*—Thuy Dao
(74) *Attorney, Agent, or Firm*—Martine Penilla & Gencarella LLP

(57) ABSTRACT

A method for optimizing executable code includes identifying a plurality of instructions in the executable code matching a predetermined instruction pattern, assessing whether the binary number conforms to a predetermined bit pattern, and transforming the plurality of instructions into transformed instructions when the binary number conforms to the bit pattern.

17 Claims, 5 Drawing Sheets

ADDRESS SIMPLIFICATION BY BINARY TRANSFORMATION

BACKGROUND

Converting source code into executable code is a two step process. In a first step, the source code is compiled into what is known as an object file. In a second step, the object file is processed by a linker which may combine the object file with other objects to generate the final executable file.

The linker will resolve references to undefined symbols by finding which other object defines a symbol in question, and replacing placeholders with the symbol's address. Since a compiler generally does not know where an object will reside in the program's address space, it assumes a fixed base location (for example, zero). The linker therefore arranges the objects in a program's address space by relocating code provided by each object file that assumes a specific base address to another base. Relocating machine code may involve re-targeting of absolute jumps, loads and stores. Since the compiler does not know what address it will ultimately need to load at the time of compiling, many compilers will assume a maximum address size requiring 64 bits unless explicitly told otherwise by the programmer/user. Other compilers may assume a different maximum size, depending on the processor architecture.

In reduced instruction set computing (RISC) processors, a 32 bit machine-language instruction may include a certain number of bits of a constant value for use as data. So long as the constant value can be expressed in the number of data bits made available by the instruction format, considerable time may be saved by having the number incorporated into the instruction itself. In particular, this avoids having to load the numbers from memory or registers. However, larger numbers require multiple instructions to load. In this case, a number is segmented into multiple parts and each part is loaded separately.

In the case where the constant value to be loaded is an address, the compiler may generate code that assumes a larger address then is actually eventually assigned by the linker. Thus, additional unnecessary instructions are incorporated into the final code which adversely affects the program size and speed of execution.

There is a continuing need to improve the efficiency and speed of execution of computer software. It would therefore be desirable to develop a system and method for mitigating the inefficiencies identified above.

SUMMARY

Broadly speaking, the present invention fills these needs by providing a system and method for address simplification by binary transformation.

It should be appreciated that the present invention can be implemented in numerous ways, including as a process, an apparatus, a system, a device, or a method. Several inventive embodiments of the present invention are described below.

In one embodiment, a method provides for optimizing executable code. The method includes identifying a plurality of instructions in the executable code matching a predetermined instruction pattern, assessing whether it is possible to form the binary number with fewer instructions than a number of instructions in the instruction pattern, and transforming the plurality of instructions into transformed instructions when the binary number can be loaded in fewer instructions than the number of instructions in the instruction pattern.

In another embodiment, a machine readable medium has program code embodied therein configured to optimize executable code. The machine readable medium comprises machine readable code for identifying a plurality of instructions in the executable code matching a predetermined instruction pattern, machine readable code for assessing whether it is possible to form the binary number with fewer instructions than a number of instructions in the instruction pattern, and machine readable code for transforming the plurality of instructions into transformed instructions when the binary number can be loaded in fewer instructions than the number of instructions in the instruction pattern.

In yet another embodiment, a method provides for optimizing executable code generated by a compiler. The method comprises identifying an address loading instruction pattern generated by the compiler, searching the executable code for existing instructions matching the address loading instruction pattern, determining whether the address can be loaded in fewer instructions than the existing instructions, and replacing the existing instructions with substitute instructions when the address can be loaded in fewer instructions than the existing instructions.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1:
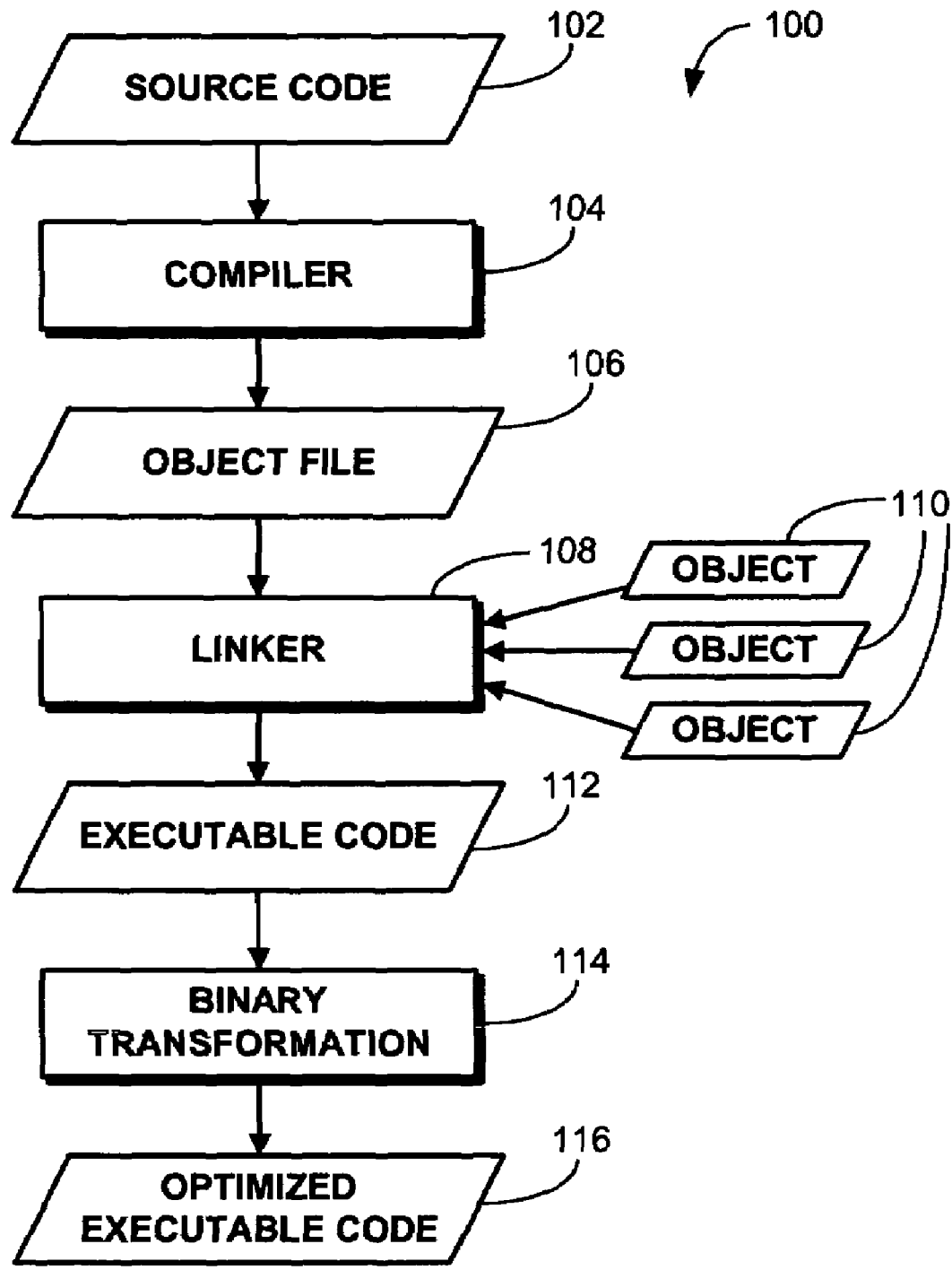
FIG. 1 presents an exemplary flow diagram depicting a process and systems for creating an optimized executable code from source code.

FIG. 1 presents an exemplary flow diagram 100 depicting a process and systems for creating an optimized executable code from source code. Source code 102 is developed by a user/programmer in a high-level language such as C. This is input into a compiler 104 which generates an object file 106 which may be combined with other objects 110 by linker 108 to generate executable code 112. Executable code 112 is then taken as an input file into binary transformation processor 114. Binary transformation processor 114 processes the executable file 112 searching for inefficient handling of low addresses as will be described hereinafter, and outputs smaller, more efficient, optimized executable code 116.

Figure 2:
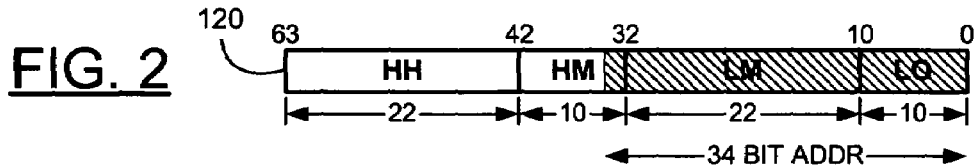
FIG. 2 shows an exemplary 64 bit word segmented into four segments.

FIG. 2 shows an exemplary 64 bit word 120 segmented into four segments identified as LO ("low"), LM ("low-middle"), HM ("high-middle"), and HH ("high-high"). LO is the least significant 10 bits of the 64 bit word, which includes bits 0 to 9. LM is the "low middle" and comprises the next 22 bits, or bits 10 to 31. Segment HM comprises bits 32 to 41 and segment HH ("high-high") comprises bits 42 to 63. An address that fits in the least significant 34 bits is identified by left-handed hatching. The 34 bit address uses all of segments LO and LM, and the least significant 2 bits of segment HM. Thus, FIG. 2 depicts a bit pattern wherein the high 30 bits are zero and the remaining bits are not defined.

Figure 3:
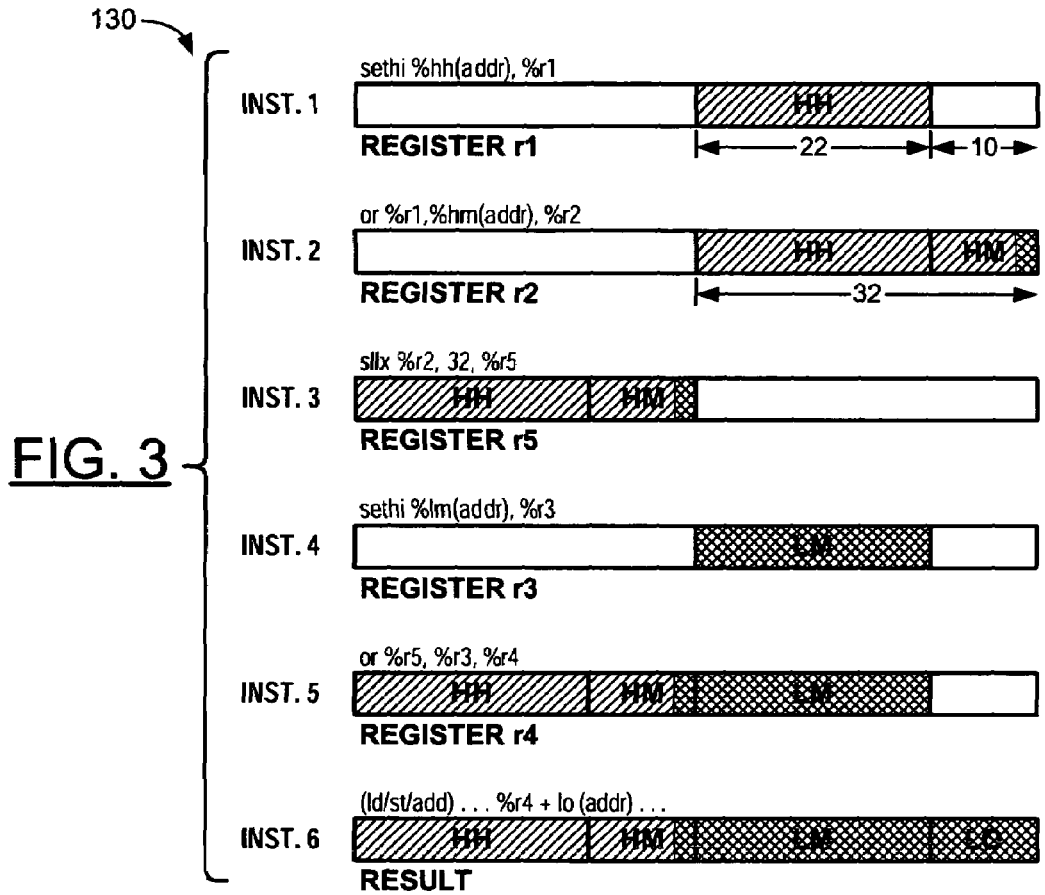
FIG. 3 shows an exemplary instruction pattern generated by the compiler for loading the address into a register.

FIG. 3 shows an exemplary instruction pattern 130 generated by the compiler for loading the address into a register.

shifts the contents of register 3 two bits to the left and sends the result to register 4. Instruction 3 then combines the contents of register 4 with the least significant 12 bits of the constant value, and sends the result to register 5.

Figure 4:
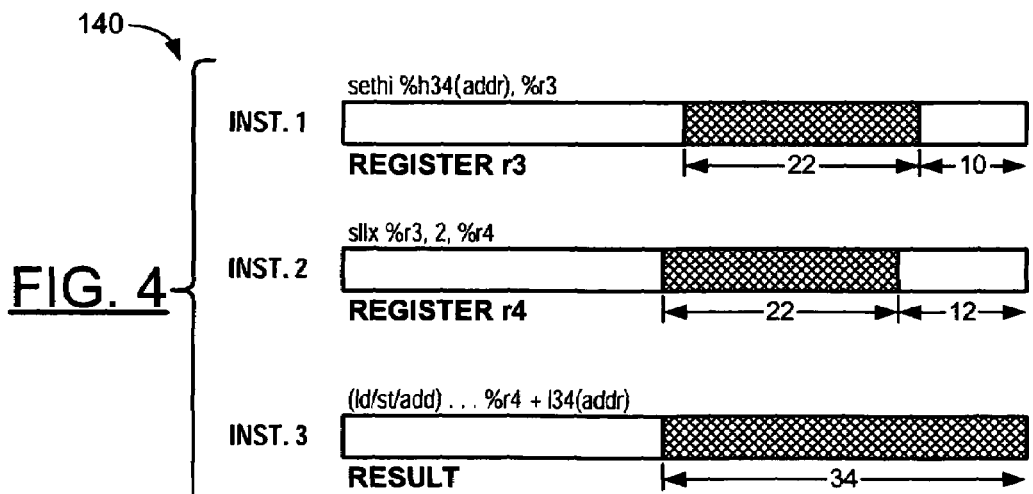
FIG. 4 shows an exemplary instruction pattern transformation comprising a series of three instructions.

FIGS. 3 and 4 graphically show the transformation from six instructions to 3 when optimizing a binary executable file. Similar transformations may be made where the compiler generates a four-instruction pattern to load 44 bits of an address that is 34 bits or fewer. Table 1 shows an exemplary transformation of this type.

TABLE 1

| 4-instruction pattern | Effect of each instruction | 3-instruction transformation | Effect of each instruction |
|---|---|---|---|
| sethi %44(addr), %t1 | Extract 22 most signif. bits of 44 bit addr, and place in bits 10-32 of register t1 | sethi %h34(addr), t2 | extract 22 most significant bits of 34 bit addr. and place in bits 10-32 of register t2 |
| or %t1, %m44(addr), %t2 | combine contents of register t1 with next 10 bits of addr. | | |
| sllx %t2, 12, %t3 | Shift contents of reg. t2 12 bits to the left, place result in reg. t3 | sllx %t2, 2, %t3 | shift contents of reg. t2 2 bits to the left, place result in reg. t3 |
| (ld/st/add) . . . %t3 + %l44(addr) | add contents of reg. t3 to the least significant 12 bits of addr | (ld/st/add) . . . %t2 + l34(addr) | add contents of reg. t3 to the least significant 12 bits of addr. |

When referencing the executable file, binary instructions are identified herein by their assembly language equivalents. Instruction 1 "sethi %hh(addr), %r1" causes segment HH to be loaded into bits 10-31 of register r1. The sethi instruction also clears the bottom 10 bits of the identified register. Instruction 2 uses an "or" operator to combine segment HM with the contents of register r1, filling the bottom 32 bits of target register r2. Instruction 3 shifts the contents of register r2 32 bits to the left and places the result into register r5. Instruction 4 uses the "sethi" instruction again to load segment LM into bits 10-21 of register 3. Instruction 5 combines the contents of registers r5 and r3 and loads the result into target register r4. Finally, instruction 6 combines the contents of register r4 and segment LO providing a result in a load, store, or add statement (ld/st/add).

It will be understood by those of skill in the art that the actual registers may vary as well as the order in which the instructions are made. For example, the instructions could have been instructions 1, 2, 4, 3, 5, 6, and with slight modification of the instruction registers, other orderings are possible. Instruction patterns that may be operated upon can be identified by analyzing the compiler operation and/or code.

It should be noted that the step of loading segment HH is wasted when the segment contains all zeros, and furthermore that most of segment HM contains no useful data. Using available instructions for segmenting a 34 bit constant value, the same 34 bit value can be provided in as little as three instructions.

FIG. 4 shows an instruction pattern transformation 140 comprising a series of three instructions. Transformation 140 provides the equivalent result of the six instructions of FIG. 3 when the constant value loaded into the register has 34 bits or fewer. The exemplary instruction pattern shown by FIG. 3 can therefore be simplified to that shown by the transformation shown by FIG. 4. Instruction 1 of FIG. 4 loads the most significant 22 bits of the constant value to be loaded into the register into bits 10-21 of target register 3. Instruction 2 then If the address value to be loaded can fit in 32 bits or fewer, then a two-instruction procedure exemplified by instructions 1 and 2 of FIG. 3 can be used to load the address. These examples are consistent with the architecture and instruction sets of Sun Microsystems™ SPARC™ processors. Thus, the optimization is capable of performing the operations for SPARC™ architecture as listed in Table 2. However, it will be noted that similar improvements can be made for optimizations of machine code for other processors in a similar manner.

TABLE 2

| Number of bits provided for by the compiler (Number of instructions) | Number of bits needed for the actual value (Number of instructions) | Number of instructions reduced by |
|---|---|---|
| 64 (6) | 44 (4) | 2 |
| 64 (6) | 34 (3) | 3 |
| 64 (6) | 32 (2) | 4 |
| 44 (4) | 34 (3) | 1 |
| 44 (4) | 32 (2) | 2 |

Figure 5:
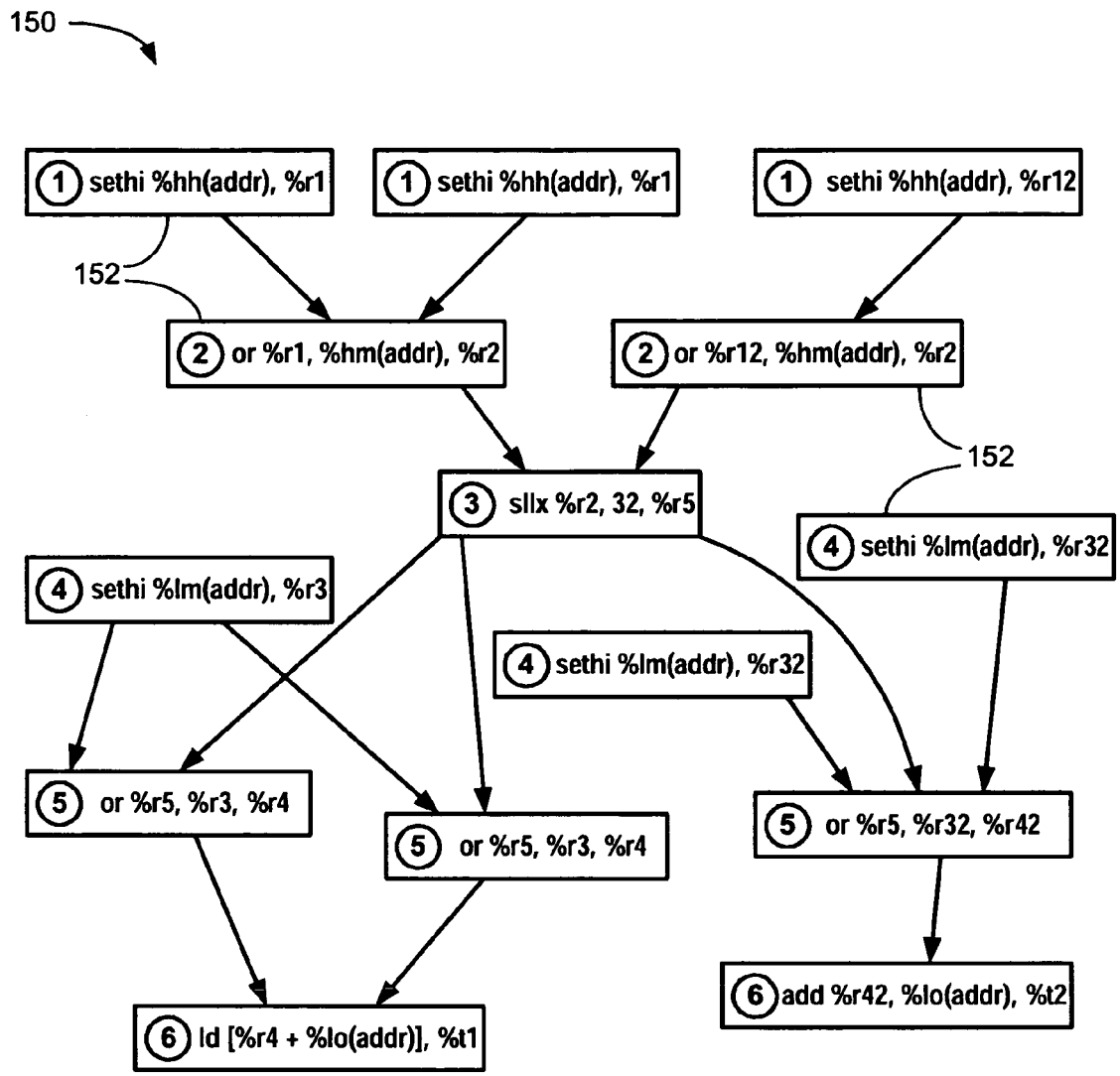
FIG. 5 shows an exemplary directed acyclic graph (DAG) depicting a series of interconnected program execution paths.
Figure 6:
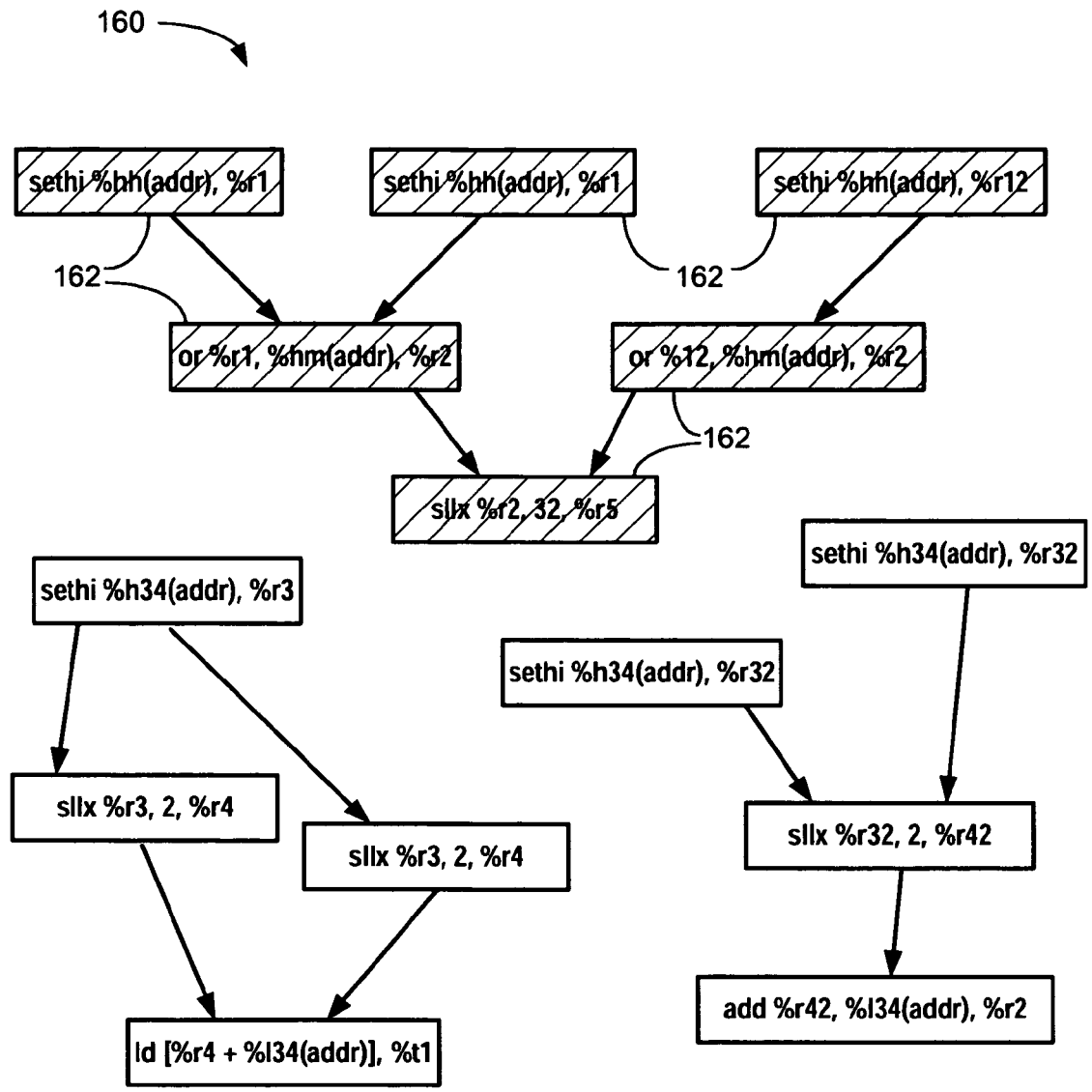
FIG. 6 shows the DAG of FIG. 5 after being processed by the binary transformation procedure.

It should be recognized that the address-loading instructions are not likely to be presented by the compiler one after the other, but instead with intervening instructions, jumps, and procedure calls. FIG. 5 shows an exemplary directed acyclic graph (DAG) 150 depicting a series of interconnected program execution paths identified by arrows from the top of the figure to the bottom. Along the program execution paths are vertices 152 identifying various statements identified by the binary transformation procedure as being part of an address loading process. FIG. 6 shows a DAG 160 after being processed by the binary transformation procedure. Shaded vertices 162 are deleted statements and the remaining vertices are replaced or modified statements from DAG 150 presented in FIG. 5.

Figure 7:
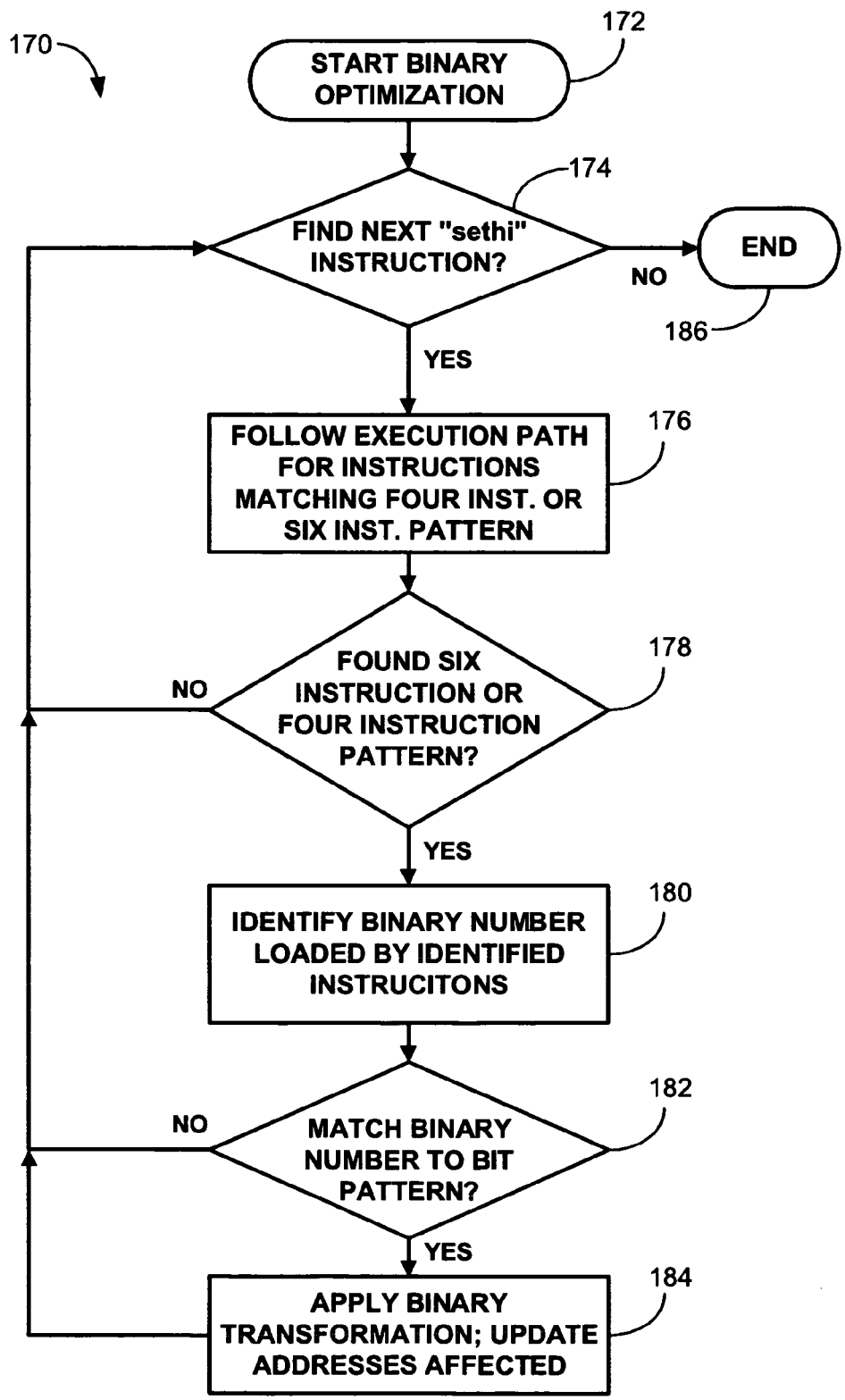
FIG. 7 shows a flowchart depicting an exemplary procedure for performing the binary transformation.

FIG. 7 shows a flowchart 170 depicting an exemplary procedure for performing the binary transformation. The exemplary procedure begins at start block 172 and flows to operation 174 wherein a next "sethi" instruction is located. If the end of the input file is reached, then the procedure flows to ending block 186.

It will be understood that the transformation process will search the executable input file for the equivalent binary instruction for the assembly language instruction "sethi." Thus, when referencing the executable file, binary instructions are identified herein by their assembly language equivalents.

If a "sethi" instruction is found, the procedure flows to operation 176 wherein the execution path is followed to search for instructions matching the six-instruction or four-instruction pattern using data-flow information available for the registers. The data-flow information is gathered by the binary transformation tool in the form of du-chains and ud-chains. This search may result in a data structure forming a DAG such as that exemplified in FIG. 5. Persons skilled in the art will understand how to generate such a diagram using data-flow information. In broad terms, after identifying the first instruction, it is read to determine the register defined by the first instruction. Then, the du-chain for that register is followed to identify second instructions (that uses that register). There may be more than one second instruction. Once all the second instructions are identified, then the ud-chains for every one of them are followed to identify other possible first instructions. This procedure is repeated until all instructions corresponding to the instruction pattern are identified and the DAG diagram is generated in memory.

After searching for instructions matching one of the patterns, the procedure flows to operation 178 wherein it is determined whether any instructions are found that match one of the two patterns. If no instructions matching the patterns are found, then the procedure flows back to operation 174 to seek the next "sethi" instruction. However, if instructions matching the instruction patterns is found, then the procedure flows to operation 180.

In operation 180, the binary number being loaded by the instructions is identified. The procedure then flows to operation 182 wherein it is determined whether the binary number matches a predetermined or pre-selected bit pattern that corresponds to a transformation. Each transformation will have a corresponding bit pattern associated with it to filter out binary numbers that the transformation cannot handle. For example, if the transformation can only handle numbers having 34 significant bits, then the corresponding bit pattern will look for binary numbers with 30 leading zeros, and any binary numbers having a 1 in the 30 most significant bits will be filtered out. Transformations may be ordered by hierarchy so that if more than one bit pattern matches the binary number, then the transformation having priority will be applied. Thus, for a binary number having 32 significant bits, the most significant 32 bits are zero, and the two instruction transformation is applied as mentioned above, and not the four instruction transformation used for binary numbers having 44 significant bits. If the binary number matches a bit pattern, then the procedure flows to operation 184, otherwise it flows back to operation 174 to search for the next "sethi" instruction.

In another embodiment, operation 182 compares the actual number of bits being loaded with the number of bits necessary to hold the value, which is based on the number of leading zeros in the binary number. Table 2 above shows instances where this comparison yields a determination that unnecessary instructions are present. If unnecessary instructions are not present, then the procedure flows back to operation 174 to search for the next "sethi" instruction. However, if unnecessary instructions are present, the procedure will flow to operation 184 to apply the binary transformation and update the addresses affected thereby.

Operation 184 applies the binary transformation which may result in some instructions being deleted and other instructions being modified as discussed above with respect to FIGS. 2-6. Each time an instruction is deleted, all the instructions thereafter move up by one position which affects their absolute address and their position relative to previous instructions. Thus, the file is examined for jumps, procedure calls, etc. that may be affected by the relocation, and they are modified accordingly. After the binary transformation is complete, the procedure returns to operation 174 to search for the next "sethi" instruction.

Although optimizations described above relate to instances where fewer bits are needed then actually provided for by the compiler, optimizations may also be implemented using mathematic operators to generate an address in fewer instructions. For example, to generate the 64-bit value 0xffffffffffffffff, just one instruction is needed: "xnor %g0,0, %t1". Similarly, if address values are very high, e.g., conforming to the bit pattern 0xffffffffxxxxxxxx signifying that the high 32 bits are all ones, just two instructions could be used for generating their values:

sethi YYYYYY, %r1
xnor %r1, ZZZ, %t1 wherein YYYYYYYY represents bitwise complement of bits 10-21 of the addresses and ZZZ represents bitwise complement of bits 0-9 of the address. It should be noted that this aspect of the transformation is not limited to a particular algebraic simplification or a particular property, such as bit length, of the calculated binary number. As such, persons of skill in the art may envision many other such algebraic simplifications for optimizing address values corresponding to other bit patterns. Thus, it should be mentioned that a plurality of transformations may be provided, each corresponding to a particular bit pattern of the binary number, and the transformation selected to be applied will depend upon which particular bit pattern the binary number corresponds. If a particular binary number matches a plurality of bit patterns, then a preferred transformation based on a predetermined or selected hierarch of transformations may be applied.

It furthermore should be mentioned that it is possible to provide transformations that provide benefits other than reducing the number of instructions. For example, transformations may be made to address loading instructions for the purpose of reducing processor power draw and/or clock cycles.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for optimizing executable code, the method comprising:
    identifying a plurality of instructions in the executable code forming a binary number from a plurality of segments and matching a predetermined instruction pattern;
    assessing whether the binary number conforms to a predetermined bit pattern;
    transforming the plurality of instructions into transformed instructions when the binary number conforms to the bit pattern, the transformed instructions being executable and operable for achieving a same result as the plurality of instructions when executed;
    finding an instruction in the executable code that matches a first instruction in the instruction pattern; and
    following possible execution paths through the executable code and identifying all related instructions corresponding to instructions in the instruction pattern to form a directed acyclic graph (DAG) of the plurality of instructions.

2. The method of claim 1, wherein the binary number expresses a value, the method further comprising determining a bit-length of the binary number, the bit length being a number of bits necessary to express the value.

3. The method of claim 2, wherein the assessing further comprises:
    determining a number of instructions required for loading the binary number based on the bit-length of the binary number; and
    comparing the number of instructions required for loading the binary number with the number of instructions in the instruction pattern.

4. The method of claim 1, further comprising identifying a plurality of instructions in the executable code matching at least one additional predetermined instruction pattern.

5. The method of claim 1, wherein the predetermined instruction pattern comprises a six instruction pattern for loading 64 bits into a register.

6. The method of claim 1 wherein the assessing comprises determining if the binary number conforms to the bit pattern, the bit pattern having a corresponding transformation; and
    the transforming comprises applying the transformation corresponding to the bit pattern.

7. The method of claim 6, wherein:
    the assessing further comprises comparing the binary number to a plurality of bit patterns, each bit pattern having a corresponding transformation, and identifying one or more bit patterns conformed to by the binary number; and
    the transforming further comprises selecting a preferred transformation from one or more transformations corresponding to the one or more bit patterns and applying the preferred transformation.

8. The method of claim 6, wherein the transformed instructions use an algebraic simplification to generate the binary number.

9. A machine readable storage medium having program code embodied therein, the program code being configured to optimize executable code, the machine readable medium comprising:
    machine readable code for identifying a plurality of instructions in the executable code that form a binary number from a plurality of segments and that match a predetermined instruction pattern;
    machine readable code for assessing whether it is possible to form the binary number with fewer instructions than a number of instructions in the instruction pattern;
    machine readable code for transforming the plurality of instructions into transformed instructions when the binary number can be loaded in fewer instructions than the number of instructions in the instruction pattern, the transformed instructions being executable and operable for achieving a same result as the plurality of instructions when executed;
    machine readable code for finding an instruction in the executable code that matches a first instruction in the instruction pattern; and
    machine readable code for following an execution path through the executable code and identifying subsequent instructions matching subsequent instructions in the instruction pattern.

10. The machine readable storage medium of claim 9, wherein the binary number expresses a value, the computer readable medium further comprising machine readable code for determining a bit-length of the binary number, the bit length being a number of bits necessary to express the value.

11. The machine readable storage medium of claim 10, wherein the machine readable code for assessing further comprises:

machine readable code for determining a number of instructions required for loading the binary number based on the bit-length of the binary number; and machine readable code for comparing the number of instructions required for loading the binary number with the number of instructions in the instruction pattern.

12. The machine readable storage medium of claim 9, further comprising machine readable code for identifying a plurality of instructions in the executable code matching at least one additional predetermined instruction pattern.

13. The machine readable storage medium of claim 9, wherein the predetermined instruction pattern comprises a six instructions for loading 64 bits into a register.

14. The machine readable storage medium of claim 13, wherein the assessing comprises determining whether the binary number can be expressed in 44 or fewer bits.

15. A method for optimizing executable code generated by a compiler, the method comprising:

identifying an address loading instruction pattern generated by the compiler;

searching the executable code for existing instructions matching the address loading instruction pattern;

determining whether the address can be loaded in fewer instructions than the existing instructions; and replacing the existing instructions with substitute instructions when the address can be loaded in fewer instructions than the existing instructions;

wherein the searching comprises identifying a first existing instruction that matches a first instruction in the address loading instruction pattern and following an execution path through the executable code for existing subsequent instructions matching subsequent instructions in the address loading instruction pattern using data-flow information.

16. The method of claim 15, wherein the determining comprises determining a bit length of the address, determining a number of instructions required to load the address based on the bit length, and comparing the number of instructions required to load the address with a number of the existing instructions.

17. The method of claim 15, wherein the identifying comprises identifying a plurality of address loading instruction patterns and the searching comprises searching the executable code for existing instructions matching any of the plurality of address loading instruction patterns.

\* \* \* \* \*